No. 642,639. Patented Feb. 6, 1900.
A. B. SMITH.
PLAYING BALL.
(Application filed July 25, 1899.)
(No Model.)
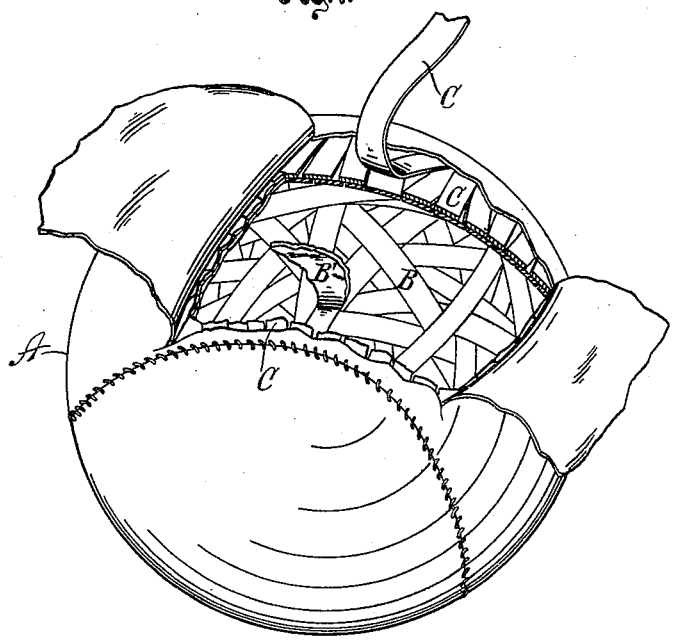
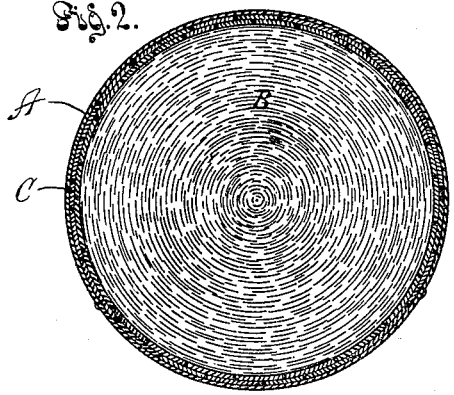

UNITED STATES PATENT OFFICE.

ALPHONSO B. SMITH, OF LOS ANGELES, CALIFORNIA.

PLAYING-BALL.

SPECIFICATION forming part of Letters Patent No. 642,639, dated February 6, 1900.

Application filed July 25, 1899. Serial No. 725,066. (No model.)

*To all whom it may concern:*

Be it known that I, ALPHONSO B. SMITH, residing at Los Angeles, in the county of Los Angeles and State of California, have invented a new and useful Playing-Ball for use in playing games, such as fronton, and which may also be used in playing base-ball, of which the following is a specification.

The object of my invention is to provide a ball which will retain its shape under very rough usage and which will be very elastic and have great rebounding properties.

In playing the game of fronton the players project the ball against a solid masonry wall with great force, and the ball at times rebounds to great distances, the player making close calculations as to the angle that the ball will rebound. This requires a ball which is a perfect sphere and has great rebounding qualities.

In carrying out my invention I use fine rubber strands treated with a binding material which slightly dissolves the rubber.

The accompanying drawings illustrate my improved playing-ball.

Figure 1 is a view of the ball with the sheepskin or other leather cover broken to expose the interior. Fig. 2 is a cross-section of the ball.

A is the ball, covered in the usual manner by sheepskin or other suitable material.

B are the rubber strips.

C are strips of dried and prepared animals' intestines.

B' indicates a free end of one of the rubber strips, which has been drawn up from the rest of the strips which form the ball. This shows the difference between the rubber strips before and after winding.

In the manufacture of my ball strips of rubber are stretched and wound upon each other until the ball is formed in the following manner: First, a core is formed by rolling a sufficient amount of rubber strips to acquire the basis for the winding. Strips of rubber are then immersed in warm boiled linseed-oil at about a temperature of 100° and are then wound around and about the ball, being stretched to their utmost tension, care being taken to preserve the spherical shape of the ball while winding. The warm linseed-oil acts as a cement and holds the strips of rubber together, while not hardening the rubber or destroying the resiliency thereof. In the drawings the end B' of the rubber has been broken loose and allowed to relax back upon itself. The warm linseed-oil forms a protecting filler and binder which prevents the entrance of moisture or anything which would affect the elasticity or resiliency of the rubber and also causes the rubber to adhere or cleave to the other rubber underlying it.

The covering of intestine-tissues around the outside of the rubber and underneath the leather covering of the ball serves as a protection against any cutting of the thin strips of rubber when the ball strikes against any hard surface, such as the hard stone wall in the game of fronton.

Now, having described my invention, what I claim as new, and desire to secure by Letters Patent, is—

1. The ball set forth comprising rubber strips tightly stretched and wound upon themselves, such strips being coated with linseed-oil.

2. The ball set forth comprising the strips of rubber wound tightly upon themselves while stretched to their full length, and the covering of intestine-tissues, as and for the purpose set forth.

3. A ball comprising rubber strips tightly stretched and wound upon each other and a binding material which slightly dissolves the rubber.

ALPHONSO B. SMITH.

Witnesses:
 JAMES R. TOWNSEND,
 F. M. TOWNSEND.